United States Patent [19]

Freebairn et al.

[11] 4,219,965

[45] Sep. 2, 1980

[54] FROST DAMAGE PREVENTION IN PLANT TISSUE

[75] Inventors: Hugh T. Freebairn, Manvel, Tex.; Jerry F. McDonnell, Norfolk, Va.

[73] Assignee: Catalytic Generators, Inc., Norfolk, Va.

[21] Appl. No.: 16,875

[22] Filed: Mar. 2, 1979

[51] Int. Cl.² ............................................. A01G 13/00
[52] U.S. Cl. ................................................ 47/2; 106/13; 252/70; 47/58; 47/DIG. 11
[58] Field of Search ......... 106/13; 47/2, 58, DIG. 11; 252/70; 426/308

[56] References Cited

U.S. PATENT DOCUMENTS

| | | | |
|---|---|---|---|
| 2,128,973 | 9/1938 | Tisdale et al. | 47/DIG. 11 |
| 2,961,798 | 11/1960 | Wells | 47/2 |
| 3,171,231 | 3/1965 | Forrest | 47/2 |
| 3,361,555 | 1/1968 | Herschler | 47/2 X |
| 3,712,803 | 1/1973 | Grybek et al. | 47/2 X |
| 4,049,837 | 9/1977 | Freebairn | 426/308 |
| 4,058,067 | 11/1977 | Wright et al. | 47/DIG. 11 |

FOREIGN PATENT DOCUMENTS

| | | | |
|---|---|---|---|
| 50-21382 | 7/1975 | Japan | 47/DIG. 11 |
| 479460 | 12/1975 | U.S.S.R. | 47/2 |
| 609525 | 6/1978 | U.S.S.R. | 47/DIG. 11 |

*Primary Examiner*—Robert E. Bagwill
*Attorney, Agent, or Firm*—Francis A. Keegan

[57] ABSTRACT

A method of preventing frost damage to plants comprising applying oleaginous materials to the tissues thereof, which materials are absorbed by the tissues in amounts sufficient to prevent swelling thereof by ice crystal formation.

17 Claims, No Drawings

FROST DAMAGE PREVENTION IN PLANT TISSUE

INTRODUCTION

The present invention relates to a product and a process for treating plant tissues to enable them to withstand subfreezing temperatures for limited times without any undesirable damage to the plant tissues.

More particularly, the present invention relates to a process and product for preventing frost damage to plant tissues when exposed to temperatures below freezing for limited periods of time by treating the plant tissues to induce a plant hardiness characteristic within the plant tissue enabling it for limited times to withstand temperatures below 32° F.

BACKGROUND OF THE INVENTION AND PRIOR ART

Many fruits and vegetables, including plants, leaves, stalks, buds, flowers and the like plant tissue are occasionally subjected to subfreezing temperatures. The degree of coldness and the period of time that the plant tissue is subjected to the freezing temperature will determine the extent of the frost damage produced in the tissues. While some plant tissues may be somewhat more hardy to colder temperatures than others, in most instances, plant tissues are unable to withstand subfreezing temperatures for an extended period of time without serious frost damage resulting.

There are complex physical and chemical changes that take place in the plant tissue when subjected to subfreezing temperatures and these changes are irreversible leaving the plant tissue either lifeless or so substantially affected that useful future growth or production would be in doubt. Frost damage to plant tissues is also possible due to the settling of ice crystals on the plant tissue due to temporary frost conditions which may include snow, sleet, etc. contacting the plant tissues. These ice crystals produced by the frost or precipitation can and frequently do produce frost damage having the same adverse effect as if the plant tissues were subjected to subfreezing temperatures for longer periods of time.

Numerous approaches have been taken in the prior art to attempt to offset or prevent frost damage in plant tissue, but none has been universally acceptable. Generally, the frost damage protection techniques of the prior art had been used in the citrus belt on the southern part of the United States where frost and subfreezing temperatures are occasionally encountered. Some of these prior art methods include the use of smoke to surround the citrus trees and prevent the escape of the whatever warmth remained in the trees and in the environment to slow down the ravages of the subfreezing temperatures. Air has also been directly heated by burners placed amongst the trees in an effort to prevent frost damage to the fruits and the trees. None of these approaches has been found to be effective.

Frost damage protection was the subject of U.S. Pat. No. 2,961,798 in which a pyrrolidone or butyrolactone was sprayed onto plants as an emulsion in the hope of raising the resistance of the plant tissue to the adverse effects of below freezing temperatures. While this prior art patent did suggest an aqueous emulsion spray, there is no recognition of the capability of such a spray being able to be absorbed by the plant tissue or what factors would influence the quantity of absorption of the spray with respect to different plants. Any beneficial effect from the use of this patented composition in preventing frost damage is not apparent. There is no disclosure of ingredients of the spray with the physical and chemical characteristics of the plant tissue and therefore the spray would not be as effective or efficient as desired for commercial use.

It is known in the prior art to utilize an oil in water emulsion as a plant spray to decrease the degree of dehydration and transpiration of water from various vegetable materials. Various oils including polysiloxanes are suggested to be used in formulating such emulsions but, there is again no recognition that each plant has particular characteristics that either may not permit the emulsion to penetrate effectively into the tissues or may not permit the emulsion to remain on the plant tissue for a sufficiently long time to obtain the necessary penetration into the plant tissue. Without such penetration through, for instance, to the under surface of the leaf the spray can not provide the desired protection.

One of the present inventor's prior U.S. Pat. No. 4,049,837 is part of the previous attempts to utilize oil in water emulsions for various purposes. In this patent chill damage protection was achieved for banana underpeel by attaining a plant tissue penetration with an emulsion that was effective in swelling the membranes surrounding latex vessels in the underpeel to inhibit the occurance of an otherwise normal phase change. The oleaginous materials disclosed to be effective according to that invention were required to have a viscosity of 10 to 10,000 centistokes. The invention was also limited to banana underpeels and did not make any reference to how penetration and swelling of cells and plant tissue from other plants could be effectively and efficiently obtained.

The prior art may be summed up simply that oil in water emulsions have been utilized in the past to treat plants for various purposes but none suggests how to achieve the penetration, if the penetration was recognized to be desired, on a variety of plant surfaces. Without such knowledge of how to coordinate an emulsion treating composition with the plant surface, the effect of the plant spray onto the plant surface could be wasted or, even if having some beneficial effect, it would be so limited as to be unacceptable. Thus, while emulsion sprays have been used in the prior art, the extent of their use has been very limited and generally unsuccessful.

While the prior art may have recognized the desirability of the emulsions to penetrate the surface of the plant tissue, there was no recognition in the prior art of how to achieve such penetration in a manner that would achieve a plant hardiness that is essential for frost damage protection. Chill damage protection as disclosed in this inventor's prior U.S. Pat. No. 4,049,837 has been distinguished therein from frost protection damage achieved by the present invention, but the specific physiological changes that occur in plants naturally with time or, that can be induced to resist the subfreezing temperatures, were not set forth in this patent.

In nature, a plant can become hardy to subfreezing conditions but the physiological changes required for hardiness cannot be achieved naturally in a sufficiently short period of time to withstand the shock of an early morning frost or an unplanned period of subfreezing temperatures. In nature, a hardy condition in the plant is demonstrated in part by a thickening of the lipid layers of the cell membrane. The changing of the cytoplasm inside the cell produces a balling up or an accumulation in the local space within the cell, leaving the water and vacular contents of the cell that contain most of the water separated from the cytoplasm. In this hardy condition, if ice crystals form in the water in the plant tissue, they cannot disrupt either the cytoplasm or the intercellular connections known as the plasmodesmata. The thick lipid envelope formed in the cell membrane around the cell protects the centrally located cytoplasm. In such a state, each cell so prepared naturally is resistant to freeze injury. Achieving plant hardy conditions in a very short period of time it is not possible in nature but, may be achieved if the cells are swelled in a manner to simulate the natural plant hardy condition.

To achieve this swelling of the cells and thereby the frost damage prevention, oleaginous materials must necessarily penetrate completely through the plant tissue and be absorbed by the cells. While considering a specific part of the plant such as the leaf, a selected emulsion containing oleaginous materials may achieve some penetration of the plant surface but unless all of the tissues were penetrated and all of the cells swelled with the oleaginous material the frost protection would be minimal, if any. To achieve the proper penetration of the emulsion below the plant tissue surface then, is a necessary initial step to be achieved before plant hardiness and therefore freeze damage protection can be induced in any plant.

OBJECTS OF THE PRESENT INVENTION

It is the principal object of the present invention to provide protection for the plant tissue against frost damage from subfreezing temperatures or frost conditions.

Another object of the present invention is to provide a process and a product which will protect all plants against frost damage and can be applied quickly and easily to achieve the necessary protection.

A further object of the present invention is the provision of a method and a product which achieves a matching of the HLB number of the treating composition and the HLB number of the plant surface.

A further object of the present invention is the provision of a method for determining the proper treating composition to be used on any plant surface in order to achieve complete penetration of the treating composition into the cells of the plant tissue.

These and other objects of the present invention will become more readily apparent upon careful consideration of the following specification:

SUMMARY OF THE PRESENT INVENTION

Frost damage prevention for any plant is achieved by providing a treating composition having an HLB number within 3 units of the HLB number determined for a particular plant tissue. The treating composition contains at least one oleaginous material and at least one emulsifing agent to permit spraying of an aqueous emulsion onto the plant tissue. Upon application of the treating composition to the plant tissue with matched HLB numbers, the treating composition penetrates to the underside of the plant surface to contact and swell all of the cells of the plant tissue, the tissues to thereby achieve frost damage prevention. The oleaginous material may be any of the mono-, di- or tri-glycerides of fatty acids, silicone oil or mineral oil. In particular, a unique combination of oleaginous materials is found to be mineral oil and dimethylpolysiloxane. The emulsifying agent is a non-ionic or anionic surfactant such as a mono- and di- glyceride of fatty acids, sorbitan fatty esters or polyoxyethylene adducts of fatty acid esters.

The treating composition capable of preventing frost damage when applied to plant tissue can be selected by providing a series of treating compositions that contain at least one oleaginous material and at least one emulsifying agent and measuring the ability of each treating composition to penetrate into the plant tissue. Measuring the ability to penetrate the plant tissue is achieved by applying a microliter droplet of the treating composition to the interveinal area of the upper leaf surface of the plant and measuring the droplet diameter after a period of time. The droplet when greater than 8 mm after one minute and absorbed after 3 minutes is an indication that the treating composition when applied to that plant tissue will be suitable for preventing frost damage.

DESCRIPTION OF THE PREFERRED EMBODIMENT

To achieve protection against frost damage, the treating composition containing one or more oleaginous materials and one or more emulsifying agents must penetrate through the tissues of the plant from the upper surface to the lower surface of the leaf, for example. The oleaginous material of the treating composition will then be able to swell the tissues to produce the plant hardiness characteristic of protection against frost. It has been discovered that matching the HLB numbers within 3 units between the plant surface and the treating composition will enable the treating composition to penetrate fully and completely into the plant tissue surface to swell the tissue.

The term "HLB" is a short term for hydrophile-lipophile balance and is known in the prior art as a guide to achieving a stable emulsion. See, for instance, the publication of Atlas Chemical Industries, Inc. "The Atlas HLB System", 1963. The present invention however is a great deal more than simply obtaining a stable emulsion through the use of an HLB system but rather more importantly, it is the use of HLB numbers to achieve compatibility heretofore not recognized in the prior art between the plant surface and the treating composition. The present invention is in part the discovery that matching the HLB of the plant with the HLB of the treating composition or at least within 3 HLB numbers of each other will achieve proper and complete penetration of at least the oleaginous portion of the treating composition into the plant tissues.

The plant surface, however, is a very complex substance having different HLBs for substantially each and every plant and is the reason why spray compositions of the prior art cannot be useful on every plant. Even the same plant located in different areas of the world and subjected to different conditions possesses varying plant surface characteristics that affect the application and penetration of spray compositions. It has been discovered that the external surface of the plant tissue is a critical element in achieving penetration of the spray composition because it is provided with a natural wax surface and a protective polymer coating (cuticle) below this wax coating. The HLB of the wax on the surface is the most significant factor in determining the HLB of the plant surface and hence the desired HLB of the treating composition. Unless there is initial compatibility or closeness between the HLB of the treating composition and that of the wax coating on the plant tissue's surface the liquid treating composition would roll off this wax coating and result in no penetration of the treating composition into the plant tissues. However, the HLB of the subsurface cutice must also be considered in order to permit the treating composition to not only pass down into the tissues but also pass through the bottom of the leaf, for instance, in order to obviate the need for spraying the liquid treating composition on other than the upper surface of the leaf. From a practical standpoint unless the treating composition would penetrate the surface of the leaf from the top surface down through the leaf and into contact with the bottom surface the frost protection would be incomplete and practically of no avail.

The suitability of the treating composition containing the oleaginous material and the emulsifying agent for application to the plant surface may be determined by first, determining the HLB number of the plant surface then, formulating a treating composition having an HLB number the same, or at least within 3 HLB numbers of the previously determined plant surface HLB and then, applying the treating composition to the surface of the plant.

Determining the HLB number of the plant may be accomplished by selecting liquids having a known HLB. The liquid is then applied to the surface of the leaf preferably at the interveinal area of pf the upper surface of the leaf in the amount of a microliter droplet of the treating composition. Thereafter, measuring the diameter of the droplet should be measured about one minute after the application to the leaf surface. If the composition has a nearly matched HLB number compared to the HLB number of the leaf surface, the composition will have spread to a diameter that is at least 8 mm and preferably 10 mm or more within approximately one minute after application to the leaf surface. When a microliter droplet has passed this criterion, it can be safely assumed that the HLB of the treating composition is substantially the same as the HLB of the plant tissue at the surface.

A finding that the one microliter droplet of the treating composition applied to the interveinal area of the leaf will be after one minute at least 8 mm and preferably 10 mm diameter, is a good indication of wettability of the leaf surface, however, such a determination is not sufficient nor does it with any certainty permit the assumption that the HLB numbers of the treating composition and of all the plant tissues near the surface are matched because it does not take into consideration the polymer undercoat (cuticle) below the exterior surface of the plant. Thus, for the most preferred treating composition in accordance with the present invention the treating composition must pass a further test. The droplet of treating composition should in 3 minutes and preferably 2-3 minutes, leave the leaf surface dry to the touch indicating that the treating composition has penetrated down through the tissues of the plant. Such penetration results from the matching of the HLB number of the subsurface cuticle as well as the often times different HLB number of the wax coating on the outer surface of the plant.

Thus in the preferable embodiment of the present invention the HLB number or compatibility of the treating composition with the plant surface should meet the dual criteria of (a) sufficiently wetting the outer surface of the plant as indicated by the diameter of the droplet being at least 8 mm and also, (b) being absorbed into and below the outer surface to leave it dry to the touch within about 3 minutes, and preferably 2 minutes after application of the droplet to the plant surface.

The oleaginous materials for use in the present invention include the mono-, di- and tri- glycerides of fatty acids such as the tri-glyceride of palmitic, oleic or stearic acids, silicone oils such as the methyl, ethyl and phenol siloxanes and mineral oil or combination thereof. It has been found that the particular combination of dimethylpolysiloxane and mineral oil in any proportion from 1% to 99% by volume either one in an admixture of the other, appears to provide an unexpected synergistic penetrating effect that achieves particularly beneficial frost damage protection.

Amongst the oleaginous materials may be included those well known vegetable oils such as soy bean, cottonseed, olive, corn, peanut, safflower, linseed, tung, and coconut oils. Oil characteristics, such as the viscosity, are not critical however, it is preferable, that the viscosity be in the range of 10 to 10,000 centistokes and preferably, in the range of 200 to 500 centistokes.

The oleaginous materials in the treating composition may be applied in any manner to the plant tissue but the most obvious method of application is by spraying from an aqueous emulsion. To form the emulsion and also to allow control of the HLB number of the treating composition for compatibility with the HLB number of the plant tissue surface, it has been found that an emulsifying agent should be added.

The emulsifying agents may be those non-ionic or anionic surfactants such as the mono- and di- glycerides of fatty acids such as the oleic, stearic, lauric and palmitic acids but also including the sorbitan fatty acid esters of the same fatty acids and polyoxyethylene adducts of the same fatty acids. The particular emulsifying agent is not critical and substantially any emulsifying agent or combination thereof capable of forming a stable emulsion and attaining the desired HLB number for compatibility with the plant surface would be suitable. The amount of the emulsifying agent would be between 0.1% and 99.9% by volume emulsifier in the admixture between the oleaginous material and the emulsifier. When used with the synergistic mixture of oleaginous materials, it is preferred that the emulsifying agent be a blend of a polyoxyethylene sorbitan ester, more preferable the oleate and a fatty acid glyceride, more preferably a glyceride of oleic acid in an amount respectively of 2-20% by volume of the oleaginous material.

Water or other solvent from 1 to 10,000 volumes per volume of the admixture of the oleaginous material and the emulsifying agent may be added to form the emulsion or solution for application to the plant surface.

The composition can be applied by spraying either by ground or aerial spraying apparatus and would be applied at any time prior to a known frost or cold front approaching the area to be protected. Typically, at least several hours or a day or more notice would be had of such an approaching cold front which would provide ample time to make the aerial or ground spray application.

The following examples of the present invention result in a fuller understanding of the operation and utility of the present invention.

EXAMPLE I

In Table A, a number of liquids for use in the treating composition are to be tested for effectiveness upon tomato leaves to prevent frost damage. The first step is to test each liquid ingredient for phytotoxicity by painting each liquid ingredient for phytotoxicity by painting each liquid material on the leaves, stems, flowers, fruit, etc. an evaluate these parts for any visibile injury in a week or so after application. To determine the HLB number of the tomato leaf, a one microliter droplet of each liquid ingredient was applied to the interveinal area of the upper leaf surface of the tomato plant. The diameter of the microliter droplet was measured on the leaf one minute later and at the end of 3 minutes the droplet was again viewed. It was determined that the preferable material or materials forming the proposed treating composition would have the largest diameter of droplet on the surface and the preferred treating composition would penetrate the leaf and appear to vanish after 3 minutes.

TABLE A

| Treating Composition (% by volume) | Droplet Diameter (after one minute) | Droplet Area (after 3 min) |
|---|---|---|
| 1. Water | 1.5 mm | wet |
| 2. Tween 80 | 1.5 mm | wet |
| 3. Span 60 | 1.5 mm | wet |
| 4. 66% Tween 80 + 33% Span 60 | 1.5 mm | wet |
| 5. Atmos 300 | 1.5 mm | wet |
| 6. 50% Tween 80 + 50% Atmos 300 | 5.5 mm | wet |
| 7. Mineral Oil | 3.0 mm | wet |
| 8. Safflower Oil (SAF) | 4.0 mm | wet |
| 9. Dimethylpolysiloxane (DMS) | 4.0 mm | wet |
| 10. 90% SAF + 2.7% Tween 80 + 7.3 Atmos 300 | 4.0 mm | wet |
| 11. 45% Mineral Oil + 45% DMS + 5% Tween 80 + 3% Atmos 300 | 8.0 mm | dry |
| 12. 90% DMS + 7% Tween 80 + 3% Atmos 300 | 10.0 mm | dry |

Atmos 300 is a mixture of mono- and di-glycerides of oleic acid. Span 60 is a sorbitan stearate ester, Tween 80 is a polyoxyethylene sorbitan oleate ester. Atmos, Tween and Span are trademarks of Atlast Chemical Industries. DMS is dimethylpolysiloxane, SAF is safflower oil.

From the foregoing test results, it can be determined that only the least two treating compositions wetted the surface of the leaves sufficiently to be absorbed into the internal tissues of the leaf. The composite HBL number of the plant external surface and subsurface cuticle layer can be calculated from the fact that composition 11 has an HLB number of approximately 10.3 and composition number 12 has an HLB of approximately 11. Thus, the tomato leaves can be said to have an HLB of approximately 11. Individual components having an HLB of approximately 11, such as DMS, having the matching HLB number of the plant tissue are shown to be ineffective thus substantiating the discovery that the treating composition of the present invention must include the oleaginous material, the emulsifer and meet the HLB number requirement.

Upon application of the treating compositions 11 and 12 of Table A to tomato leaves and subjecting the plants to freezing temperatures of 25° to 29° for 12 to 24 hours, no damage to the tomato leaves was observed.

EXAMPLE II

Tobacco seedlings 10 inches high in pots were tested in accordance with the procedure of Example I and it was determined that the HLB number of the tobacco leaves had an HLB number of approximately 10.8. The compositions of Table B were used in aqueous emulsions and sprayed on the plants until the leaves were completely covered and that any additional material applied would run off.

Inspection of the leaves after application of the preferred treating composition indicated that the individual cells were swelled with the oleaginous material which had penetrated through the leaf from the upper surface down through to the bottom surface of the leaf. The stalks and buds and other parts of the plant were similarly swelled indicating as induced plant hardiness. The plants were then subjected to a freezing temperature of 25° to 29° F. for 18 hours with the roots in pots insulated to prevent freezing of these parts . Leaf injury was measured one week later. The results are set forth in Table B.

TABLE B

| Treating Composition (% by Volume) | Results |
|---|---|
| 13. Water 100% | 95% of leaf surface was damaged. No protection. |
| 14. 90% Water 9% Mineral Oil 0.6% Tween 80 + 0.4% Atmos 300 | 20% of leaf surface was damaged. 80% protection |
| 15. 90% water, 9% DMS 0.7% Tween 80, 0.3% Atmos 300 | 15% of leaf surface was damaged. 85% protection |
| 16. 90% water, 4.5% SAF, 4.5% DMS 0.51% Tween 80 & 0.391% Atmos 300 | No leaf damage. Almost 100% protection |
| 17. 90% water, 4.5% Mineral Oil 4.5% DMS, 0.65% Tween 80 0.35% Atmos 300 | No leaf damage. 100% protection |

From the foregoing it can be determined that the combination of mineral oil and dimethylpolysixloxane was unique in protecting against frost damage even beyond the relatively effective treating compositions number 14 and 15 that provided 80–85% protection. It is not completely understood why the combination of mineral oil and dimethylpolysiloxane with emulsifiers has a synergistic effect beyond that of the individual oleaginous materials but tests have proven that this combination of oleaginous materials is often far superior to anyone of the oleaginous material alone.

It should be understood that the scope of the present invention is limited solely by the following claims.

We claim:
1. The process of preventing frost damage to plant tissue comprising,
   determining the HLB number of the plant tissue,
   providing a treating composition having an HLB number within 3 units of the determined HLB number of the plant tissue,
   said treating composition containing an oleaginous material and an emulsifyng agent,
   applying said treating composition to said plant tissue in an amount sufficient to penetrate and swell the tissues to achieve frost damage prevention.
2. The process of claim 1 including,
   said oleaginous material being selected from the group consisting of mono-, di- and tri-glycerides of fatty acids, silicone oil and mineral oil.
3. The process of claim 1 including,
   said oleaginous material being a vegetable oil.
4. The process of claim 1 including,
   said oleaginous material being dimethylpolysiloxane.
5. The process of claim 1 including,
   said oleaginous material being a combination of mineral oil and dimethylpolysiloxane.
6. The process of claim 1 including, said emulsifying agent being selected from non-ionic and anionic surfactants.

7. The process of claim 1 including,
said emulsifying agent being selected from mono- and di-glycerides of fatty acids, sorbitan fatty acid esters and polyoxyethylene adducts to fatty acid esters.

8. The process of claim 1 including,
said oleaginous material being a mixture of polysiloxane and mineral oil and
said emulsifying agent being a mixture of polyoxyethylene sorbitan fatty acid ester and a fatty acid glyceride.

9. The process of claim 8 including,
said oleaginous material being equal parts by volume polysiloxane and mineral oil and
said emulsifier being a mixture of a polyoxyethylene sorbitan fatty acid ester in an amount of 2-20% by volume of the oleaginous material and
a fatty acid glyceride in the amount of 1-15% of the volume of the oleaginous material.

10. The process of selecting a treating composition capable of preventing frost damage to plant tissue comprising,
providing a series of treating compositions containing at least one oleaginous material and at least one emulsifying agent,
measuring the ability of each said treating composition to penetrate into the plant tissue including,
applying a microliter droplet of said treating composition to the interveinal area of the upper leaf surface of the plant,
measuring the diameter of the droplet approximately 1 minute after application to the leaf surface and
selecting the treating composition having a droplet diameter of greater than approximately 8 mm as that composition having the ability to penetrate and swell the tissues of the plant to prevent frost damage.

11. The process of claim 10 including,
said diameter being greater than approximately 10 mm, 12. The process of claim 10 including,
the additional requirement that the area of the droplet should be dry to the touch after approximately 3 minutes.

13. The process of Claim 10 including,
said diameter being greater than approximately 10 mm and the additional requirement that the area of the droplet should be dry to the touch after approximately 3 minutes.

14. The processs of preventing frost damage to plant tissue comprising,
providing a treating composition containing at least one oleaginous material and at least one emulsifying agent,
applying a microliter droplet of said treating composition to the interveinal area of the upper leaf surface of the plant
measuring the diameter of the droplet approximately 1 minute after application to the leaf surface,
selecting the treating composition having a droplet diameter of greater than approximately 8 mm having the ability to penetrate and swell the tissues of the plant to prevent frost damage and
applying said treating composition to said plant tissue in an amount sufficient to penetrate and swell the tissues to achieve frost damage prevention.

15. The process of claim 14 including,
said diameter being greater than approximately 10 mm.

16. The process of claim 14 including,
the additional requirement that the area of the droplet should be drying to the touch after approximately 3 minutes.

17. The process of claim 14 including,
said diameter being greater than approximately 10 mm and
the additional requirement that the area of the droplet should be dry to the touch after approximately 3 minutes.

* * * * *